July 11, 1950 F. WALLER 2,514,686
MEASURING DEVICE
Filed Jan. 16, 1948
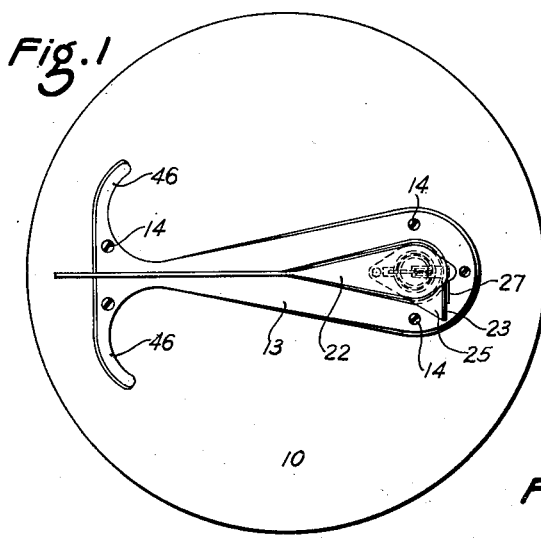
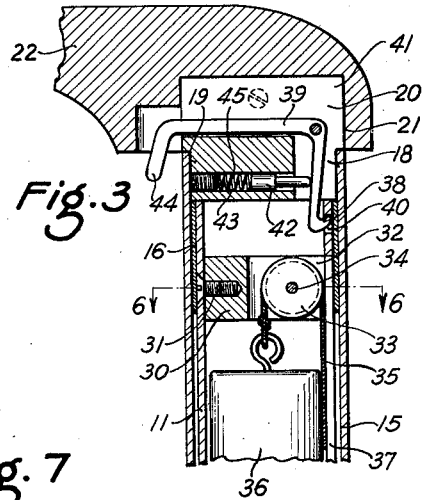
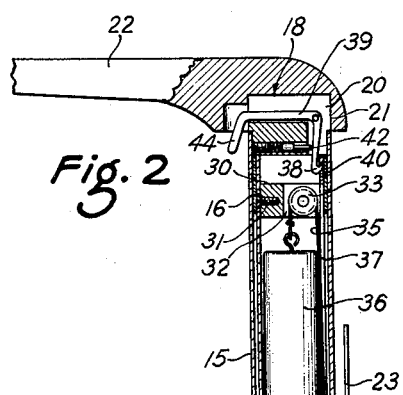
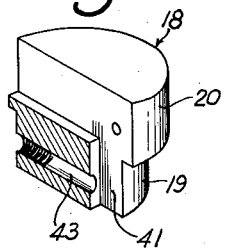
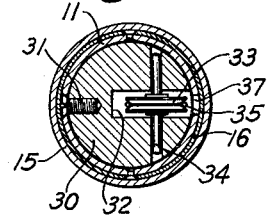
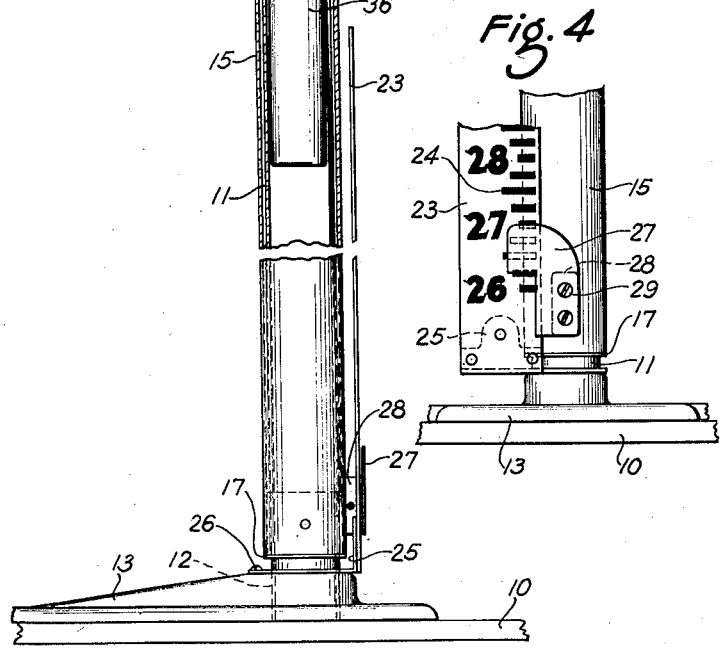
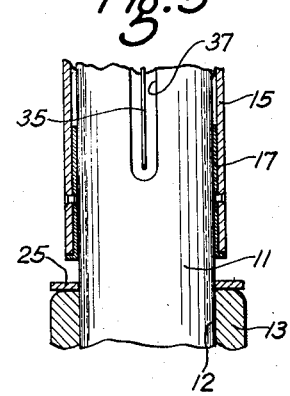
Fred Waller
INVENTOR
BY George A. Gillette Jr.
ATTORNEYS Patented July 11, 1950

2,514,686

UNITED STATES PATENT OFFICE 2,514,686

MEASURING DEVICE

Fred Waller, Huntington Station, N. Y., assignor to Eastman Kodak Company, Rochester, N. Y., a corporation of New Jersey Application January 16, 1948, Serial No. 2,717

4 Claims. (Cl. 33—8)

This invention relates to a measuring device and more particularly to a device for measuring the variable distance from a fixed plane to a relatively stable object, the arm of which is held against the object with a uniform pressure.

In the custom-tailoring industry, it is becoming increasingly popular to take a photograph of the customer to supplement the customary measurements as a reference at a later date when the coat and/or pants are actually being cut and put together. The customer is usually photographed with a number of measuring tapes placed around the waist, chest, hips, etc., to provide a check for the cutter when the suit is being cut. At the present time, however, there is no satisfactory arrangement for providing a measurement of the inseam of the pant leg which will appear in a photograph as a check against the measurement as originally made.

The present invention provides for a device which will give the correct inseam measurement and which necessitates no careful adjustment or locking in the final position. The customer is positioned on a platform and straddles an arm which is raised into position toward the crotch and which by means of a weight is moved toward and held against the crotch with a uniform pressure. A scale is fixed to the platform and the member to which the arm is attached carries an index member adjacent the scale so that when the arm has come to rest, the position of the arm with respect to the base will be indicated on the scale by the index member. A locking means is provided to maintain the fixed and movable members in a collapsed position.

The primary object of the invention, therefore, is to provide a measuring device in which the movable member is moved and held in any position against the stable object with a uniform pressure.

Another object of the invention is to provide a measuring device in which a gravity means within one of the members moves the measuring arm toward the object and holds it thereagainst with a uniform pressure.

A still further object of the invention is to provide a measuring device in which a weight within one of the members moves and holds the measuring arm against the object with uniform pressure.

Yet another object of the invention is to provide a measuring device in which the fixed member telescopes within the movable member carrying the arm and within which the weight for moving and holding the measuring arm against the object with uniform pressure is concealed.

And yet another object of the invention is to provide a measuring device in which the scale is fixed to the support member and the index member is attached to the lower end of the movable member with the scale commencing with a figure equivalent to the distance of the measuring arm from the support in the collapsed position.

These and other objects of the invention will be apparent to those skilled in the art by the description which follows:

The above objects of the invention are embodied in a device for measuring the variable distance from a fixed plane to a stable object in which the device comprises a support member including a base and a vertical tubular extension, a tubular member including an arm extending perpendicular to the axis of the tubular extension and an index member fixed to the lower end and adapted to receive the tubular extension and to be movable therealong in telescoping relation, a scale fixed to said support member adjacent said index member, means on said support member for positioning said object with respect to said tubular extension, means for locking said tubular member to said tubular extension, and a gravity means including a weight within said tubular extension and operatively connected to said tubular member, said weight exceeding the weight of said tubular member, arm and index member for moving and holding said arm against said subject with a uniform pressure.

Reference is now made to the accompanying drawing wherein similar reference characters designate similar parts and wherein:

Fig. 1 is a plan view of the measuring device;

Fig. 2 is a side elevation, partially in section, showing the arrangement of the weight within the vertical tubular extension;

Fig. 3 is an enlarged vertical section showing the arrangement for mounting the weight within the tubular extension and the locking arrangement for holding the tubular members in a collapsed position;

Fig. 4 is a partial side elevation showing the arrangement of the scale and index member;

Fig. 5 is a partial side elevation in section to show the slot in the tubular extension for the cord for joining the weight to the movable tubular member;

Fig. 6 is a section taken substantially on the line 6—6 of Fig. 3; and

Fig. 7 is a partial perspective of the cap in which the locking means is mounted and which is pressed into the end of the tubular member.

Although the present disclosure of the invention is described in connection with its use in the tailoring field, it shall be understood that this invention may also be applied to many other fields. In the illustrated embodiment of the invention, the support member comprises the base 10 and the vertical tubular extension 11 which is secured to the base 10 by a press fit into the well 12 in the base plate 13 which is secured to the base by the screws 14.

The inside diameter of the tubular member 15 is enough larger than the outside diameter of the extension 11 so that when the extension 11 is inserted in the member 15, it is spaced therefrom. The upper end of the extension 11 has secured thereto a fibre bushing 16 which maintains the two tubes in spaced relation at one end in the collapsed position, and the member 15 has a fibre bushing 17 fixed to its lower end to maintain the tubes in spaced relation at the other end when in the collapsed position. This arrangement permits easier movement of the member 15 with respect to the extension 11 and eliminates the tendency for the tubes to bind as they would if in contact throughout their entire length. This construction also permits telescoping of the tubes to provide a compact structure.

The upper end of the member 15 is provided with a cap 18 which has a reduced portion 19 which is inserted in the end of the member 15 and a portion 20 which is adapted to enter a well 21 in the arm 22. The cap 18 is secured to the arm 22 and the member 15 in any well-known manner so that the arm and the tubular member move as a unit. From Figs. 1 and 2, it will be noted that the arm 22 extends perpendicular to the axis of the extension 11 and the member 15.

The scale 23 is provided with graduations 24 and is secured to the bracket 25 which is fixed to the base plate 13 by the rivets 26. From Fig. 4, it will be noted that the graduations commence with a figure which is equivalent to the distance of the arm 22 from the plate 10 when in the fully collapsed or locked position, as shown in Fig. 2. The member 15 has the index member 27 fixed to its lower end so that it lies adjacent and slightly overlaps the scale 23. The index member 27 is spaced from the member 15 by the block 28, both being held in position by the screws 29.

A ring 30 is secured to the extension 11 near the top thereof, see Figs. 2 and 3, by the screws 31 and is provided with a recess 32 in which the pulley 33 is mounted on the shaft 34 journaled in the ring. A cord 35 encircles the pulley 33 and has one end secured to the weight 36 within the extension 11 and the other end secured to the lower end of the member 15, see Fig. 2. The extension 11 is provided with a longitudinal slot 37, see Figs. 2 and 5, to permit the cord 35 to be passed through a hole in the member 15 and secured to the block 28. The weight 36 provides the means for moving the member 15 toward the object and holding it thereagainst with a uniform pressure. The weight of the weight 36 is slightly greater than the total weight of the member 15 and its associated parts, such as the arm 22, cap 18, index member 27, etc., and at the same time great enough to overcome the friction of the bushings 16 and 17 so that the member 15 will move freely with respect to the extension 11 when released therefrom.

The extension 11 and the member 15 are locked together in the collapsed position by the nose 38 of the lever 39 engaging the aperture 40 in the extension 11. The locking means or lever 39 is pivotally mounted in the L-shaped slot 41 in the cap 18, the nose 38 being held in the aperture 40 by the spring-biased plunger 42 in the hole 43 in the lower end of the cap 18. The lever 39 is provided with a finger piece 44 which extends below the arm 22, see Fig. 3, so that as the finger piece 44 is moved upwardly the nose 38 will be removed from the aperture 40 against the retaining action of the spring 45 and the plunger 42 to release the member 15 from the extension 11.

In order to position the object or subject with respect to the extension 11 and/or the arm 22, means in the form of arcuate extensions 46 of the base plate 13 are provided to receive the heels of the object. When the subject is positioned with his heels against the arcuate extensions 46 and straddling the arm 22, the finger piece 44 is moved toward the arm 22 to release the nose 38 of the lever 39 from the aperture 40 in the extension 11. The weight 36 will then move downwardly and being connected to the member 15 will move it and the arm 22 toward the crotch of the subject and will hold the arm 22 thereagainst with a uniform pressure irrespective of the height of the arm from the base 10. If desired, the member 15 and the arm 22 may be moved manually upon being released from the extension 11 until it is relatively near the subject's crotch and at that point permit the weight 36 to move the arm the remaining distance toward the subject. Since the index member 27 is fixed to the member 15, it will move therewith and will denote on the scale 23 the correct inseam measurement because the scale 23 had been graduated to start with the figure or measurement of the arm 22 from the plate 10. The scale 23 and the position of the index 27 will then appear in the photograph taken of the subject to give an additional reference which may be checked against the original measurement. The graduations 24 on the scale 23 may be corrected for taking into account the fact that the pant leg should not touch the base 10 but should be a certain fixed distance from the base 10 as is customary practice in the art of tailoring.

While the present invention is intended to be used in the tailoring art, it is conceivable that the device may be used in any one of many other fields where the distance between a fixed plane and a stable object is to be measured. The end of the arm 22 may be modified to form a hook or a nose, such as is found on various types of calipers to engage the object. The length of the extension 11 and the member 15 may be varied in accordance with the length of the measurements to be made together with a corresponding change in the weight 36. The only limitation upon the device being that the subject or object must be relatively stable, since the arm 22 is moved thereagainst with pressure. Since other uses and modifications of the invention are possible, the scope of the invention is not to be limited to the illustrated embodiment but is defined by the appended claims.

Having now particularly described my invention what I desire to secure by Letters Patent of the United States and what I claim is:

1. A device for measuring a variable distance from a fixed plane to a stable object comprising a base member, a hollow cylindrical member extending vertically from said base member and provided with a vertically extending slot, a cylindrical sleeve including at one end thereof a horizontal extension and movable from a fully telescoped position with respect to said cylindrical member to a position in which said horizontal extension engages said object, and a counterweight contained within said cylindrical member and operatively connected through said vertical slot to said sleeve for gravitationally biasing said horizontal extension against said object with a uniform pressure.

2. A device for measuring a variable distance from a fixed plane to a stable object comprising a base member, a hollow cylindrical member extending vertically from said base member and provided with a vertically extending slot, a vertical scale fixed to said base member and spaced from said cylindrical member, a cylindrical sleeve including at one end thereof a horizontal extension and at the other end thereof an index member adjacent said scale and movable from a fully telescoped position with respect to said cylindrical member to a position against said object, and a counterweight contained within said cylindrical member and operatively connected through said vertical slot to said sleeve for gravitationally biasing said horizontal extension against said object with a uniform pressure and for moving said index member along said scale.

3. A device for measuring a variable distance from a fixed plane to a stable object comprising a base member, a hollow cylindrical member extending vertically from said base member and provided with a vertically extending slot, a movable assembly including a cylindrical sleeve adapted to receive said cylindrical member and having at one end thereof a horizontal extension provided with a cavity and movable from a fully telescoped position with respect to said cylindrical member to a position in which said horizontal extension engages said object, a counterweight contained within said cylindrical member and operatively connected through said vertical slot to said movable assembly for gravitationally biasing said horizontal extension against said object with a uniform pressure, and a locking means movably mounted within said cavity and comprising a locking portion adapted to engage said cylindrical member for maintaining said cylindrical member and said movable assembly in said fully telescoped position and a release portion extending outwardly from said assembly for manual release of said movable assembly to permit said counterweight to move said horizontal extension against said object.

4. A device for measuring a variable distance from a fixed plane to a stable object comprising a base member, a hollow cylindrical member extending vertically from said base member and provided with a vertically extending slot, a vertical scale fixed to said base member and spaced from said cylindrical member, a movable assembly including a cylindrical sleeve adapted to receive said cylindrical member and having at one end thereof a horizontal extension provided with a cavity and at the other end thereof an index member adjacent said vertical scale and movable from a fully telescoped position with respect to said cylindrical member to a position in which said horizontal extension engages said object, a counterweight contained within said cylindrical member and operatively connected through said vertical slot to said movable assembly for gravitationally biasing said horizontal extension against said object with a uniform pressure, and a locking means movably mounted within said cavity and comprising a locking portion adapted to engage said cylindrical member for maintaining said cylindrical member and said movable assembly in said fully telescoped position and a release portion extending outwardly from said assembly for manual movement to release said movable assembly to permit said counterweight to move said horizontal extension against said object and to move said index member along said scale.

FRED WALLER.

REFERENCES CITED

The following references are of record in the file of this patent:

UNITED STATES PATENTS

| Number | Name | Date |
|---|---|---|
| 177,702 | Ender | May 23, 1876 |
| 2,126,517 | Turpan | Aug. 9, 1938 |
| 2,324,334 | Sutton | July 13, 1943 |
| 2,386,181 | Bailey | Oct. 9, 1945 |

FOREIGN PATENTS

| Number | Country | Date |
|---|---|---|
| 433,461 | France | Oct. 27, 1911 |
| 481,529 | Great Britain | Mar. 14, 1908 |
| 883,352 | France | Mar. 22, 1943 |